United States Patent Office 3,297,639
Patented Jan. 10, 1967

3,297,639
POLYETHERS OF TRIAZINE AND POLYHYDRIC AROMATIC COMPOUNDS
Lewellyn G. Picklesimer, 6842 Winthrop Drive, and Thomas F. Saunders, 31 Meehan Drive, both of Dayton, Ohio 45431
No Drawing. Filed Feb. 5, 1963, Ser. No. 256,479
5 Claims. (Cl. 260—61)

The invention described herein may be manufactured and used by or for the United States Government for governmental purposes without payment to us of any royalty thereon.

This invention relates to a synthetic polymeric ether composition of matter and to the method by which it is made.

In recent years the literature has contained accounts of work done on polymers that contain the triazine ring in the polymer chain made by techniques that involve solution and melt condensations. The polymers made by these processes are characterized by good thermal stability but they have low molecular weights and they are not useful materials. The symmetrical triazines are described further in the publication "Heterocyclic Compounds," volume 7, published in 1961 by Robert C. Elderfield, by the John Wiley and Sons, Inc., New York, N.Y.

The present invention provides a new polymer that has high molecular weight and is useful. The new polymer has limited ranges of solubility and has exceptional thermal stability.

The objects of this invention are to provide as a new composition of matter a new plastic material that consists of polyethers of triazine and polyhydric aromatic compounds and to provide a manufacturing process therefor.

The new type of polymer that is disclosed herein is in general obtainable from triazinyl halides and polyhydric aromatic compounds by interfacial polycondensation.

The inertness to most solvents of the new type of polymer here of interest and its thermal stability, are believed to be due in part to the stability of the ether linkage between the monomeric units and to the thermal stability of the triazine and the aromatic nuclei which comprise the polymer chain. These characteristics provide a polymer that is useful as fibers, coatings, films, and the like.

The invention that is disclosed herein is made by condensing triazinyl halides dissolved in a suitable organic solvent to make an organic or benzene solution, with the sodium or other alkaline metal salts of the polyhydric aromatic compounds in water to make an aqueous solution, and by combining the solutions in an interfacial condensation reaction.

In the aqueous solution illustrative polyhydric aromatic compounds are the dihydroxy benzene compounds: resorcinol, hydroquinone and dihydroxybiphenyl.

In the organic or benzene solution illustrative solvents are benzene, chlorobenzene, chloroform, and dibutyl phthalate, in which are dissolved cyanuric chloride or phenyldichlorotriazine, as disclosed in the examples cited hereinafter. Cyanuric chloride is also known as trichloro-s-triazine. The organic solution is immiscible with the water solution which contains the alkaline metal salt of the polyhydric aromatic compound.

In the practice of the present invention, the polyhydric aromatic compound is dissolved in the aqueous solution of the theoretical or slightly in excess amount of alkali. The triazinyl chloride is dissolved in an organic solvent that is immiscible with the aqueous solution, such that the solution that has the lower specific gravity floats on the top of the solution that has the higher specific gravity, with an interface therebetween under laboratory conditions of temperature and of pressure, which are taken as about 75° F. and one atmosphere, respectively.

The film here of interest at the interface between the two immiscible solutions forms rapidly and, under proper conditions, may be drawn continuously away from the interface as a hollow tube or as a thread, or the interface may be broken down into drops and the product may be recovered as a powder. It is to be noted that the products of the process that is disclosed herein are ethers formed by interfacial reactions.

The film product drawn from the interface between the two immiscible solutions is clear, tough, pliable and commonly is transparent or translucent to the passage of light therethrough. The film product chars in the temperature range between 400° C. and 500° C. without melting and leaves a carbonaceous residue.

The film product may be isolated as a powder by stirring together the two immiscible solutions to cause polymerization to occur at the interfaces of the droplets formed by the stirring operation and the solid particles are separated from the liquid phase by filtration.

In the formation of the polyethers here of interest, the triazine compounds contain halogen atoms that, preferably, are chlorine in the triazine rings. The polyhydric aromatic compounds contain a minimum of two hydroxyl groups on the rings or ring and not necessarily on the same ring. Water is cited herein illustratively for dissolving the polyhydric aromatic compound and may be replaced by another solvent as long as a suitable interface between two immiscible solutions is provided.

The following examples of the practice of the present invention are illustrative successful reductions to practice thereof.

*Example 1*

The quantities of the reactants and the solvents that are combined together in the following described manner are in the proportions of:

Aqueous solution:
    Resorcinol _____ 2.20 gms., 0.02 mole.
    Sodium hydroxide _____ 1.60 gms., 0.04 mole.
    Water _____ 50 ml.
Organic solution:
    Cyanuric chloride _____ 3.68 gms., 0.02 mole.
    Benzene _____ 50 ml.

The indicated quantities of resorcinol or 1,3 benzenediol and sodium hydroxide are dissolved in the distilled water in preferably a first glass container, such as a beaker or the like, as the aqueous solution. In a second container the organic solution is prepared by dissolving the indicated quantities of cyanuric chloride, or 2,4,6-trichloro-1,3,5-s-triazine, in the benzene with the application, if preferred, of enough heat to accelerate the making of a uniform solution.

The benzene solution of cyanuric chloride is floated carefully on the surface of the water or aqueous solution of sodium resorcinate. A transparent film forms instantly at the interface of the two immiscible solutions and continues to reform as rapidly as it is removed. The product is cleaned and dried as set forth hereinafter.

*Example 2*

The compositions of the second example solutions duplicate the compositions of the first example solutions.

The resorcinol and the sodium hydroxide are dissolved in the water in a first glass beaker as the aqueous solution. The cyanuric chloride is dissolved in the benzene with slight heating in a second beaker as the organic solution. The benzene solution of cyanuric chloride is floated on the surface of the water solution of sodium resorcinate.

The combined solutions are stirred vigorously with a motor-driven laboratory stirrer for thirty minutes. The product separates out as a fine, white powder that is filtered out of the liquid as product.

The white powder product is washed four times with 50 milliliter portions of benzene and then with acetone. The product so isolated is then washed several times with dilute aqueous sodium hydroxide and finally with distilled water. The product so prepared is then dried in a desiccator.

The dried product from the starting material quantities in both Examples 1 and 2 weighs 2.20 gms. for a yield of 46% by weight. The end product analyzes by weight 0.60% chlorine and 15.72% nitrogen.

*Example 3*

The quantities of the reactants and the solvents in this example were combined in the following proportions by weight:

Aqueous solution:
    Hydroquinone _____ 2.20 gms., 0.02 mole.
    Sodium hydroxide _____ 1.60 gms., 0.04 mole.
    Water _____ 50 ml.
Organic solution:
    Cyanuric chloride _____ 3.68 gms., 0.02 mole.
    Benzene _____ 50 ml.

The hydroquinone, or 1,4-benzenediol and sodium hydroxide are dissolved in the water in a first beaker as the aqueous solution. The cyanuric chloride and the benzene are added together in a second beaker and are warmed sufficiently to make a uniform solution as the organic solution.

The benezene solution of cyanuric chloride is then carefully floated on the surface of the water solution of hydroquinone and sodium hydroxide, such that a film forms rapidly at the interface between the two immiscible solutions.

The film can be made to adhere to the tip of a glass rod or the like that is passed down through the benzene solution until it contacts the film. The film is then withdrawn as a continuous collapsed tube by drawing it upwardly through the benzene solution as product. The collapsed tube product is washed alternately with methanol and with water and is finally dried.

The clean, dried end product produced from the stated Example 3 quantities of reactants weighs 0.88 gm. for a 27.2% yield. The end product analyzes by weight 3.39% chlorine, 15.63% nitrogen, 54.25% carbon, 20.00% oxygen, and 3.36% hydrogen.

*Example 4*

The quantities of the reactants and the solvents that are combined in the fourth example are in the proportions by weight of:

Aqueous solution:
    Hydroquinone _____ 4.40 gms., 0.04 mole.
    Sodium hydroxide _____ 3.2 gms., 0.08 mole.
    Water _____ 50 ml.
Organic solution:
    Cyanuric chloride _____ 7.36 gms., 0.04 mole.
    Chloroform _____ 50 ml.

The hydroquinone, sodium hydroxide and water are placed in a first beaker as the aqueous solution. The cyanuric chloride and chloroform are placed in a second beaker as the organic solution. The beaker containing the chloroform solution of cyanuric chloride is placed on a hot plate and the water solution of hydroquinone and sodium hydroxide is floated on top to provide the desired film at the interface between the two immiscible solutions.

When the chloroform solution starts to boil the beaker is removed from the hot plate and the desired product in the form of a collapsed tube is drawn rapidly and continuously from the interface between the two immiscible solutions, and is cleaned and dried as before.

*Example 5*

The quantities of reactants and reagents in this example are:

Aqueous solution:
    Hydroquinone _____ 4.40 gms., 0.04 mole.
    Sodium hydroxide _____ 3.2 gms., 0.08 mole.
    Water _____ 50 ml.
Organic solution:
    Cyanuric chloride _____ 7.36 gms., 0.04 mole.
    Dibutylphthalate _____ 50 ml.

One beaker contains the solution of hydroquinone, sodium hydroxide and water. Another beaker contains the cyanuric chloride dissolved in the dibutylphthalate.

The dibutylphthalate solution of cyanuric chloride is heated on a hot plate at 80° C. and the water solution of hydroquinone and sodium hydroxide is floated on the surface for a film at the interface. The film as a collapsed tube, is withdrawn rapidly and continuously from the interface between the two immiscible solutions, washed, cleaned and dried.

*Example 6*

The quantities of the reactants and the solvents in this example are by weight:

Aqueous solution:
    Hydroquinone _____ 1.10 gms., 0.01 mole.
    Sodium hydroxide _____ 0.80 gm., 0.02 mole.
    Water _____ 25 ml.
Organic solution:
    2-phenyl-4,6-dichloro-s-
      triazine _____ 2.26 gms., 0.01 mole.
    Benzene _____ 25 ml.

In this example the benzene solution of 2-phenyl-4,6-dichloro-s-triazine is floated on the water solution of hydroquinone and sodium hydroxide. The two immiscible solutions are heated to about 35° C. before the film forms at their interface. The film is opaque and is drawn rapidly and continuously from the interface and is cleaned and dried as the end product.

*Example 7*

The quantities of the reactants and of the solvents in this example are by weight:

Aqueous solution:
    4,4'-dihydroxybiphenyl _____ 4.7 gms., 0.025 mole.
    Sodium hydroxide _____ 2.0 gms., 0.025 mole.
    Water _____ 50 ml.
Organic solution:
    Cyanuric chloride _____ 4.7 gms., 0.025 mole.
    Benzene _____ 50 ml.

The benzene solution of cyanuric chloride is floated on the top of the water solution of 4,4'-dihydroxybiphenyl and sodium hydroxide. The film at the interface between the two immiscible solutions at room temperature is milky-white and is drawn away from the interface as a strong and pliable product.

*Example 8*

The quantities of the reactants and the reagents in this example are:

Aqueous solution:
    Hydroquinone _____ 5.50 gms., 0.05 mole.
    Sodium hydroxide _____ 4.0 gms., 0.10 mole.
    Water _____ 25 ml.
Organic solution:
    Cyanuric chloride _____ 9.3 gms., 0.05 mole.
    Chlorobenzene _____ 25 ml.

The hydroquinone and the sodium hydroxide are dissolved in the water in one beaker and the cyanuric chloride and chlorobenzene are mixed together in another beaker. The water solution of hydroquinone is floated on top of the chlorobenzene solution of cyanuric chloride. A film forms slowly at the interface between the two immiscible solutions.

The beaker containing the two immiscible solutions is put on a hot plate and as it starts to boil the film is withdrawn from the interface. The product is transparent, tough and pliable.

The products that are produced by the processes that are described herein are new, high molecular weight polyethers of triazine and polyhydric aromatic compounds.

A continuous thread product is obtained except where the reaction is run at the boiling temperature of the organic phase and, more specifically, where (a) all reactions wherein 2,4-dichloro-6-phenyl-1,3,5-triazine is the triazine reactant, in which the product is a powder that is soluble in dimethylsulfoxide; and where (b) the product of the reaction between cyanuric chloride and 2,2-bis(4-hydroxy-3,5-dibromophenyl) propane, in which the product is a powder that is soluble in dimethylsulfoxide, which has the structure $CH_3SOCH_3$.

Polyhydric aliphatic compounds, such as ethylene glycol of the structure $HO-CH_2-CH_2OH$, also undergo interfacial condensation with cyanuric chloride or trichloro-s-triazine or $C_3Cl_3N_3$ in a corresponding interfacial condensation reaction but at a less rapid rate than the reaction rate of the aromatic polyhydric compounds here of interest.

The product that results from reacting hydroquinone with cyanuric chloride is believed to have the structure:

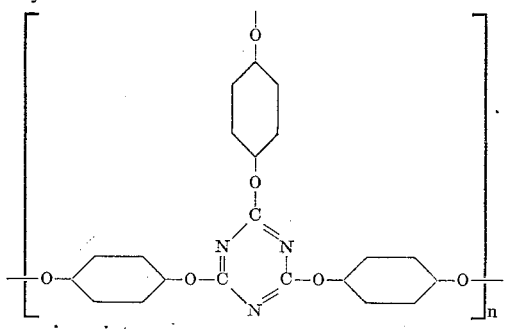

where $n$ is an integer.

The product that results from reacting hydroquinone with 2-phenyl-4,6-dichloro-s-triazine is believed to have the structure:

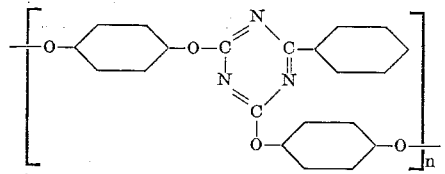

where $n$ is an integer.

The product that results from reacting 4,4'-dihydroxy-biphenyl with cyanuric chloride is believed to have the structure:

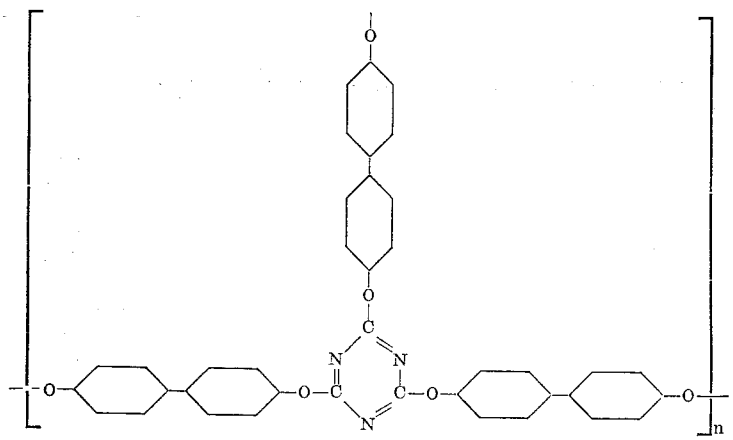

where $n$ is an integer.

It is to be understood that the reactants, reagents, solvents, etc., and the process steps that are disclosed herein and the products that are obtained therefrom have been submitted as experimentally confirmed findings that embody the present invention and that comparable modifications may be made therein without departing from the spirit and the scope of this invention.

We claim:

1. The composition of matter polymerization product having a melting point of at least 400° C. from react- The product that results from reacting resorcinol with cyanuric chloride is believed to have the structure:

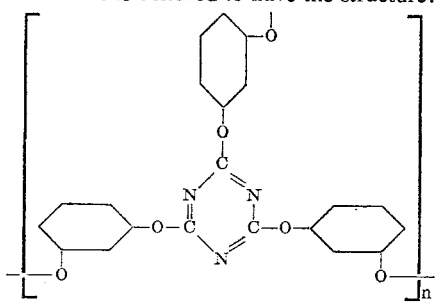

where $n$ is an integer.

ing resorcinol with cyanuric chloride and having the structure:

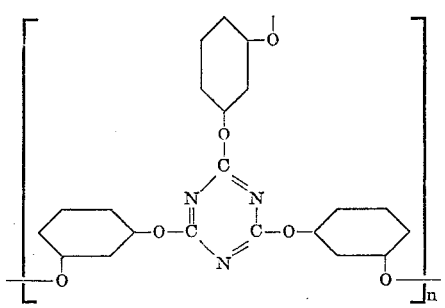

where $n$ is a positive integer.

2. The composition of matter polymerization product having a melting point of at least 400° C. from reacting hydroquinone with cyanuric chloride and having the structure:

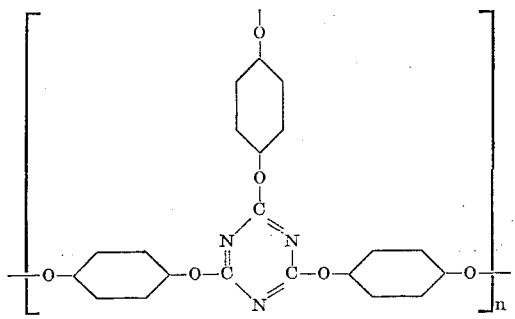

where $n$ is a positive integer.

3. The composition of matter polymerization product having a melting point of at least 400° C. from reacting hydroquinone with 2-phenyl-4,6-dichloro-s-triazine and having the structure:

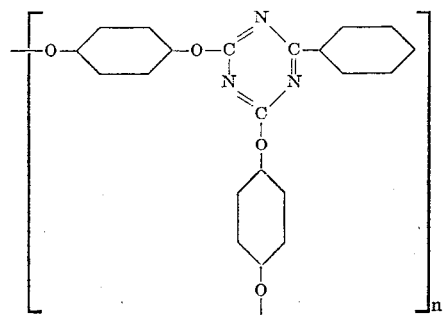

where $n$ is a positive integer.

4. The composition of matter polymerization product having a melting point of at least 400° C. from reacting 4,4'-dihydroxybiphenyl with cyanuric chloride and having the structure:

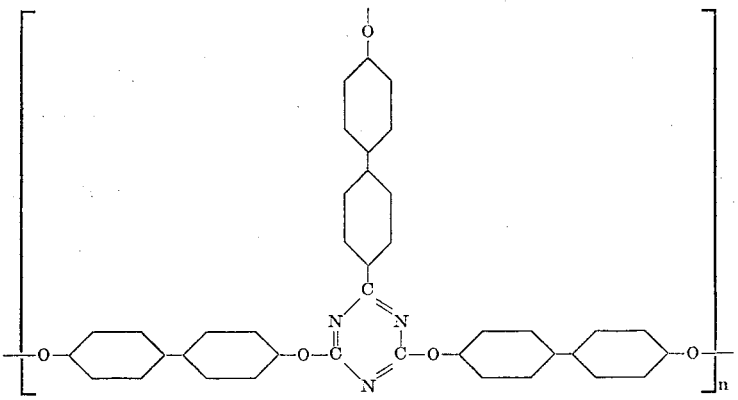

where $n$ is a positive integer.

5. The process for synthesizing by interfacial condensation a polymeric ether by reacting (1) an aqueous solution of an alkali and a polyhydric aromatic compound selected from the grop consisting of resorcinol, hydroquinone and dihydroxybiphenyl and (2) an organic solution of a solvent selected from the group consisting of benzene, chlorobenzene, chloroform and dibutylphthalate and a triazine compound selected from the group consisting of cyanuric chloride and phenyldichlorotriazine, and thereafter isolating from the interface the polymeric ether.

References Cited by the Examiner

UNITED STATES PATENTS

| | | | |
|---|---|---|---|
| 2,743,258 | 4/1956 | Coover | 260—61 |
| 3,039,872 | 6/1962 | Boer | 260—47 |

SAMUEL H. BLECH, *Primary Examiner.*

WILLIAM H. SHORT, *Examiner.*

J. C. MARTIN, *Assistant Examiner.*